No. 801,069. PATENTED OCT. 3, 1905.
J. H. FLEMING.
CENTRIFUGAL CREAM SEPARATOR.
APPLICATION FILED JULY 1, 1904.
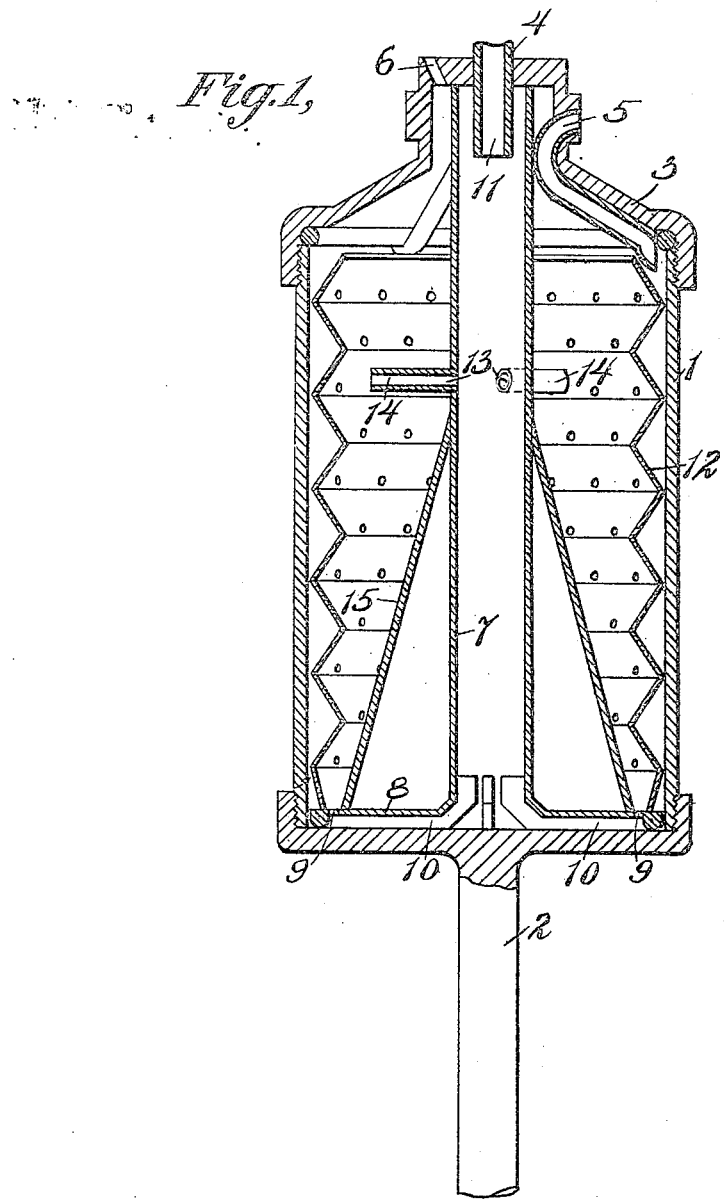
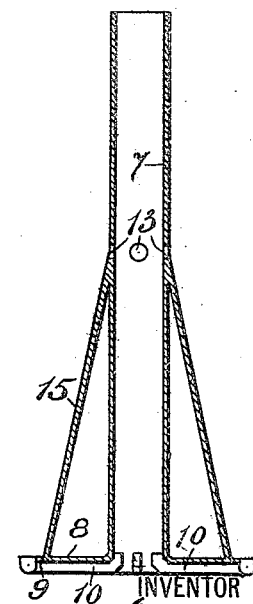
WITNESSES:
INVENTOR

UNITED STATES PATENT OFFICE.

JAMES H. FLEMING, OF NEWARK, NEW JERSEY.

CENTRIFUGAL CREAM-SEPARATOR.

No. 801,069.          Specification of Letters Patent.          Patented Oct. 3, 1905.

Application filed July 1, 1904. Serial No. 214,858.

*To all whom it may concern:*

Be it known that I, JAMES H. FLEMING, a citizen of the United States, residing at Newark, in the county of Essex and State of New Jersey, have invented certain new and useful Improvements in Cream-Separators; and I do hereby declare the following to be a full, clear, and exact description of the invention, such as will enable others skilled in the art to which it appertains to make and use the same.

My invention relates to improvements in centrifugal cream-separators, and particularly to means for preventing "flushing" therein—*i. e.*, the rejection of the entering milk from the feed-tube due to the formation of foam.

My invention is particularly intended to be applied to centrifugal cream-separators of the type comprising within the revolving bowl usual in such machines a central feed-tube discharging milk at its bottom only and arranged to impart rapid rotary motion to the milk so discharged and to deliver it into the main portion of said bowl at points near the walls thereof; but my invention is not limited to any particular construction of such type of cream-separator nor to its use in connection with that type of cream-separator only.

Heretofore trouble has been experienced in the operation of centrifugal cream-separators due to the collection in the feed-tube of foam which is sufficiently tenacious to exclude the entering milk from the feed-tube and cause it instead to pass off with the cream. This trouble is experienced particularly at certain times of the year and appears to be due to some ingredient then present in the milk. From its nature the trouble is a serious one, because it results in irregularity in the separation of the cream from the blue milk and in the production of cream of varying densities.

The objects of my invention are to disperse and destroy foam which may collect and tend to obstruct the flow of entering milk, to avoid the overflow of unseparated milk through either outlet of the machine, and to do this without complicating the construction of the machine, without changing its manner of operation or reducing its efficiency, and without material increase in cost.

I will now proceed to describe my invention with reference to the accompanying drawings, showing a conventional form of separator-bowl and contained parts of a cream-separator and two forms of feed-tubes which may be used therein and which embody my invention and will then point out the novel features in claims.

In the said drawings, Figure 1 shows a central vertical section of said separator-bowl and contained parts, including one form of my improved feed-tube; and Fig. 2 is a similar section of an alternative form of my feed-tube.

In the said drawings, 1 indicates an ordinary separator-bowl mounted upon a vertical shaft 2 and adapted to be rotated thereby at high speed by any suitable means. (Not shown.) 3 indicates the ordinary cover or top for such bowl. The said top is provided with an opening 4, through which the stream of milk to be separated enters, and is also provided with the usual outlets 5 and 6 for skimmed milk and cream, respectively. The pans in which the skimmed milk and cream are received from these outlets are not shown, but may be of the usual type.

7 designates the central feed-tube, which extends from near the central admission-opening 4 downward or substantially downward to the bottom of the bowl 1 and is there provided with a flange 8, substantially covering the bottom of the bowl and provided near its periphery with openings 9. This flange is raised slightly from the bottom of the bowl by ribs 10, forming propeller-vanes which serve to impart to the entering milk the necessary rapid rotary motion. These vanes may project upward a short distance into the vertical portion of the feed-tube, as shown, in order that they may the better impart rotary motion to the milk. The milk is admitted to this central feed-tube in the ordinary manner through a feed-cup, of which only the spout 11 is shown in the drawings, said spout projecting downward a short distance into the feed-tube. The milk so delivered falls to the bottom of the feed-tube, where it is caught by the revolving vanes, and being spread out in a thin sheet between the flange 8 of the tube and the bottom of the cup of the bowl passes up through the orifices 9 into the main portion of said bowl. By the time the milk has passed through these orifices 9 it is in very rapid rotation and by centrifugal action the blue milk is separated from the cream, the latter, which is the lighter constituent, being forced to the center of the bowl, where it collects in a thin cylindrical band surrounding the vertical portion of the tube 7, the blue milk filling the remainder of the bowl. Both the cream and the blue or skimmed milk rise continuously within the bowl, the cream passing off through the outlet 6 and the skimmed milk through outlet 5. It is usual in separators of this sort to employ a collecting-cylinder 12, which serves to gather together the smaller particles of fat which are not in the first instance separated from the blue milk, but which are collected by said cylinder into masses possessing sufficient body to be forced by displacement back to the main body of separated cream surrounding the feed-tube. The particular collecting-cylinder shown is one well known; but I do not limit myself to the use of any particular type of collecting-cylinder or to the use of such cylinder at all.

So far as above described the construction of the cream-separator is an ordinary and well-known construction. In the operation of such separators it has been found that at certain times of the year and owing to some peculiar quality of the milk foam collects in the feed-tube in such quantity and having such tenacity that it prevents the flow to greater or less extent of entering milk downward through the feed-tube, rejecting said milk and causing it to pass off with the cream. This is of course a serious trouble. I have found that it may be avoided by providing openings or conduits in the feed-tube—such, for example, as the openings 13 in Figs. 1 and 2. I believe that these orifices or openings prevent the formation of foam in such masses as will exclude the entering milk by providing outlets for the escape of the air, which, when entangled with the milk, produces the foam. However, I do not confine myself to any particular theory as to the action which these orifices have, the fact being that when present they do prevent the collection of foam to any material extent. The precise location of the cream-line is not directly observable but theoretical considerations show that the dotted lines x x, Fig. 1, represent approximately the location of the cream-line in the particular type of separator illustrated in that figure. The said openings 13 may be simple orifices in the walls of the feed-tube, as shown in Fig. 2, or the said openings may be carried out beyond the normal cream-line by means of branch tubes 14, Fig. 1, the outer ends of which are beyond said normal cream-line. I believe that it is desirable that the openings shall be carried out beyond the normal cream-line, as otherwise any foam passing out therethrough encounters the cream wall surrounding the feed-tube.

In another application for Letters Patent, filed June 25, 1904, Serial No. 214,094, I have illustrated an alternative form of feed-tube, having at its bottom an enlarged portion provided with foam-dispersing openings. The outer orifices are outside the normal cream-line, and in such application I have claimed broadly the invention herein described. Therefore I do not claim the said invention broadly herein.

The feed-tubes shown herein are constructed in accordance with Patent No. 666,344, issued to me, in that they comprise a downwardly-flaring cone 15, fitted to the tube and inclosing with said tube and flange 8 a dead space. The construction and arrangement of means for preventing collection of foam herein illustrated, involving the provision of openings in the feed-tube intermediate the ends thereof with or without the branch tubes 14, is particularly suitable for feed-tubes provided with the said cone, though of course the same construction may be employed in tubes not provided with such cone.

It is obvious that my invention is susceptible of many variations and modifications without departing from the essential features thereof, and therefore I do not limit myself to the particular details of construction and arrangement herein illustrated and described.

What I claim is—

1. In a centrifugal separator, the combination with a rotatable receptacle, of a bottom-discharge central inlet-tube therefor provided at its bottom with an outwardly-projecting flange having in it an opening outside of the normal cream-line for the passage of liquid from between said flange and the bottom of the receptacle upward, said tube provided at a point above said flange and within the normal cream-line, with foam-dispersing means.

2. In a centrifugal separator, the combination with a rotatable receptacle, of a bottom-discharge central inlet-tube therefor, provided at its bottom with an outwardly-projecting flange having in it an opening outside of the normal cream-line for the passage of liquid from between said flange and the bottom of the receptacle upward, said tube provided at a point above said flange with a conduit connecting the space within said tube and the normal cream-line with the space outside of said line.

3. In a centrifugal separator, the combination with a rotatable receptacle, of a bottom-discharge central inlet-tube therefor provided with a branch pipe projecting therefrom and connecting the interior of said tube with the space surrounding said tube, the inner orifice of said pipe being within the normal cream-line and the outer orifice of said pipe being beyond the normal cream-line.

4. In a centrifugal separator, the combination with a rotatable receptacle, of a bottom-discharge central inlet-tube therefor, provided at its bottom with an outwardly-projecting flange having in it an opening outside of the normal cream-line for the passage of liquid from between said flange and the bottom of the receptacle upward, said tube provided at a point above said flange with a branch pipe the inner orifice of which is within the normal cream-line and the outer orifice of which is beyond such normal cream-line.

5. A feed-tube for centrifugal separators comprising a tube open at the bottom and adapted to discharge liquid through such opening into a rotatable separating-receptacle, said tube provided at a point above its bottom with a branch pipe projecting therefrom, the inner orifice of which is within the normal cream-line.

6. A feed-tube for centrifugal separators comprising a tube open at the bottom and having at the bottom a laterally-projecting flange, said tube adapted to discharge liquid through such open bottom into a rotatable separating-receptacle, and provided at a point above said flange with a foam-dispersing conduit the inner orifice of which is within the normal cream-line.

7. A feed-tube for centrifugal separators comprising a tube open at the bottom and having at the bottom a laterally-projecting flange, said tube adapted to discharge liquid through such open bottom into a rotatable separating-receptacle, and provided at a point above said flange with a branch pipe the inner orifice of which is within the normal cream-line.

In testimony whereof I affix my signature in the presence of two witnesses.

JAS. H. FLEMING.

Witnesses:
H. M. MARBLE,
MINERVA P. BARNET.